United States Patent [19]

Campagna

[11] 4,371,023
[45] Feb. 1, 1983

[54] TUBELESS TIRE WITH INSERT FOR PREVENTING COLLAPSE IN THE EVENT OF LOSS OF AIR PRESSURE

[75] Inventor: Thomas G. Campagna, Selden, N.Y.

[73] Assignee: Aqualume, Incorporated, Selden, N.Y.

[21] Appl. No.: 209,425

[22] Filed: Nov. 24, 1980

[51] Int. Cl.³ .................. B60C 17/00; B60C 13/00; B60C 9/00
[52] U.S. Cl. ....................... 152/158; 152/330 RF; 152/374; 428/36; 428/71
[58] Field of Search ......... 152/158, 157, 165, 330 RF, 152/340, 342, 339, 313, 341, 155, 374, 400; 428/36, 71, 99, 100, 319.3, 319.7, 319.9

[56] References Cited

U.S. PATENT DOCUMENTS

| | | | |
|---|---|---|---|
| 974,861 | 11/1910 | Dawson | 152/157 X |
| 1,374,390 | 4/1921 | Rode, Jr. | 152/313 X |
| 1,396,648 | 11/1921 | Mills et al. | 152/157 |
| 1,585,875 | 5/1926 | Price | 152/157 |
| 2,708,469 | 5/1955 | Lydon | 152/157 |
| 3,250,310 | 5/1966 | Johnson | 152/158 |
| 3,397,728 | 8/1968 | McCrary et al. | 152/158 |
| 4,163,466 | 8/1979 | Watts | 152/158 |

Primary Examiner—Caleb Weston
Assistant Examiner—Thomas Bokan
Attorney, Agent, or Firm—Alfred A. D'Andrea, Jr.

[57] ABSTRACT

An insert for tubeless tires to maintain vehicle control and prevent tire collapse in the event of puncture or other loss of air pressure. The insert has a toroidal center core of solid material, a foam casing of compressible but resilient foam material annularly surrounding the cylindrical core, and a thin outer flexible shell annularly surrounding the casing.

10 Claims, 16 Drawing Figures

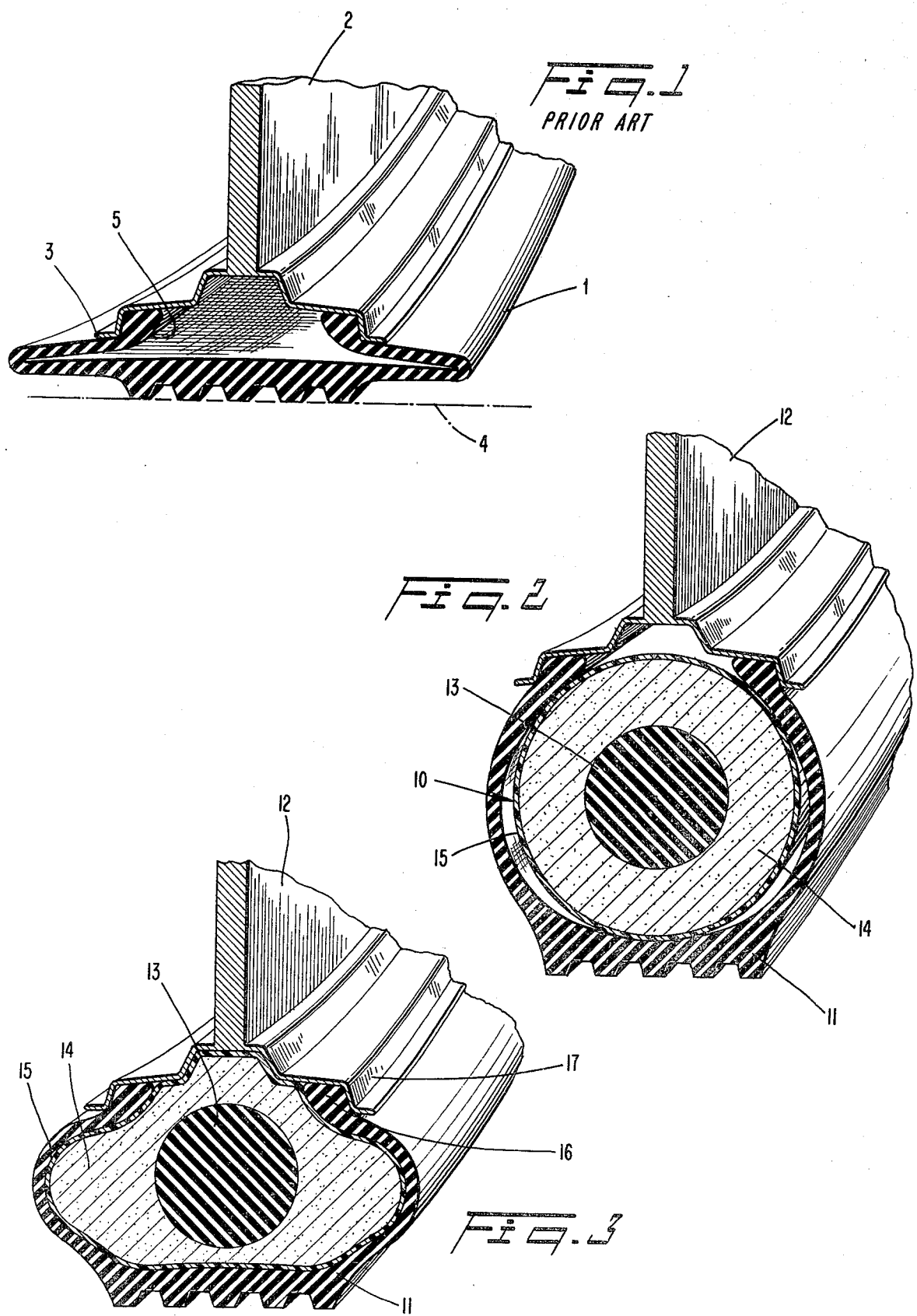

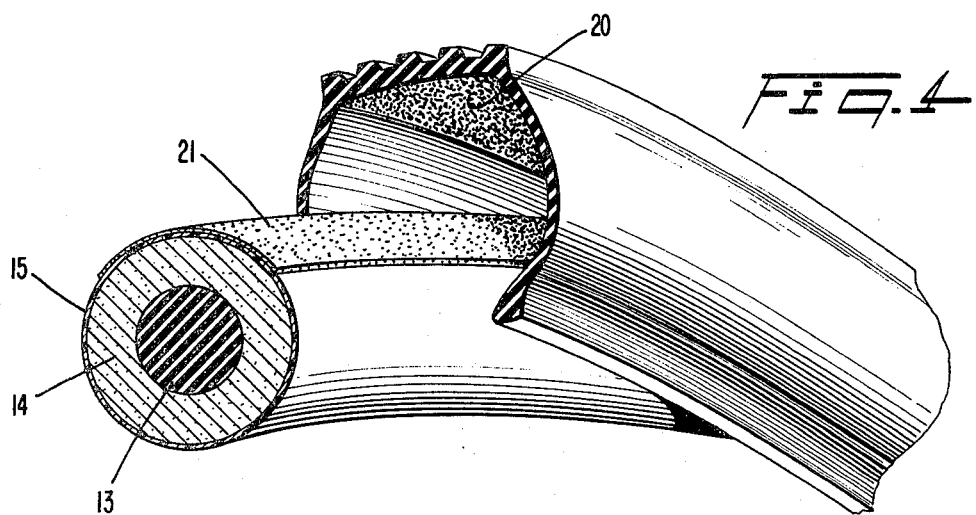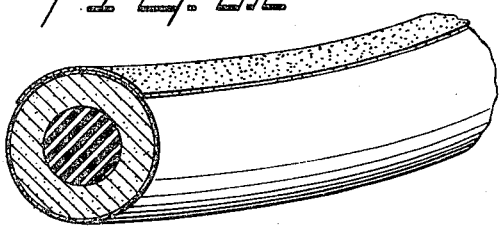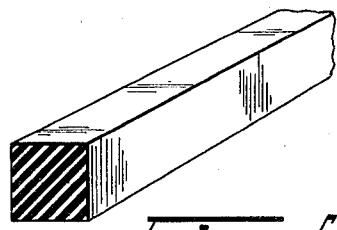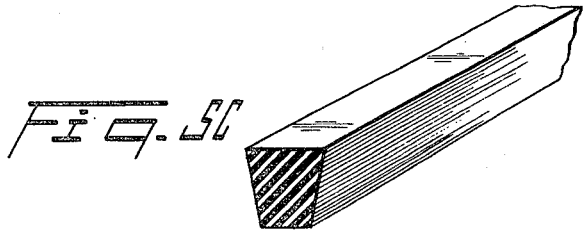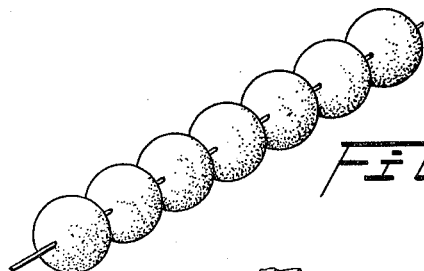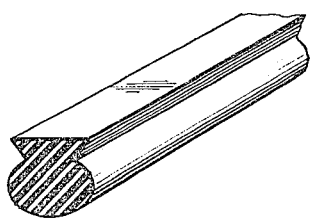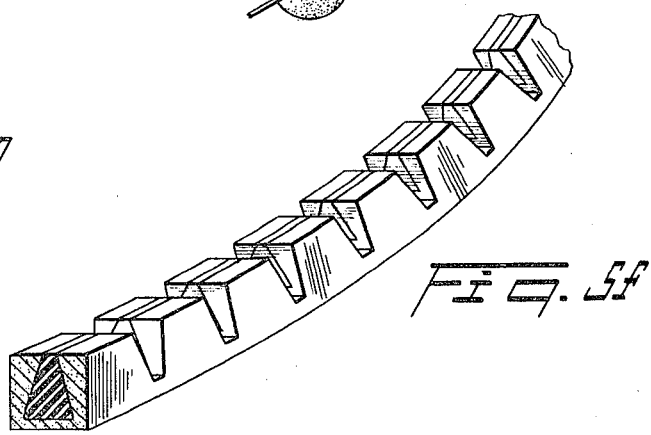

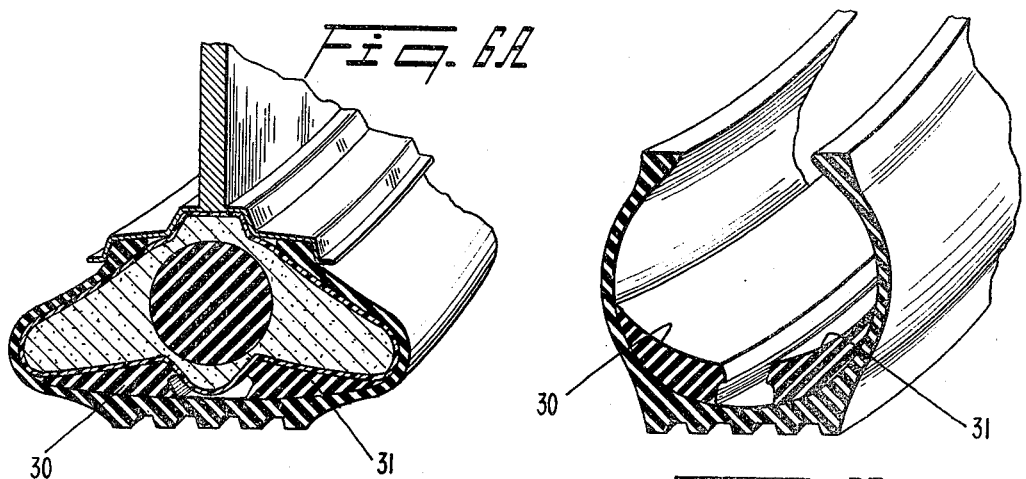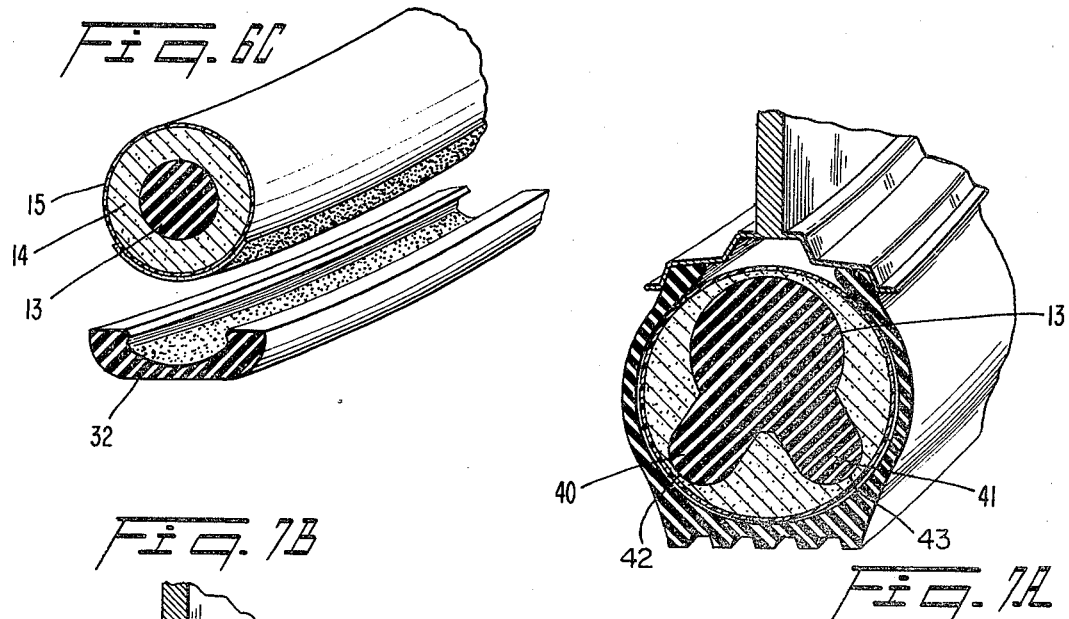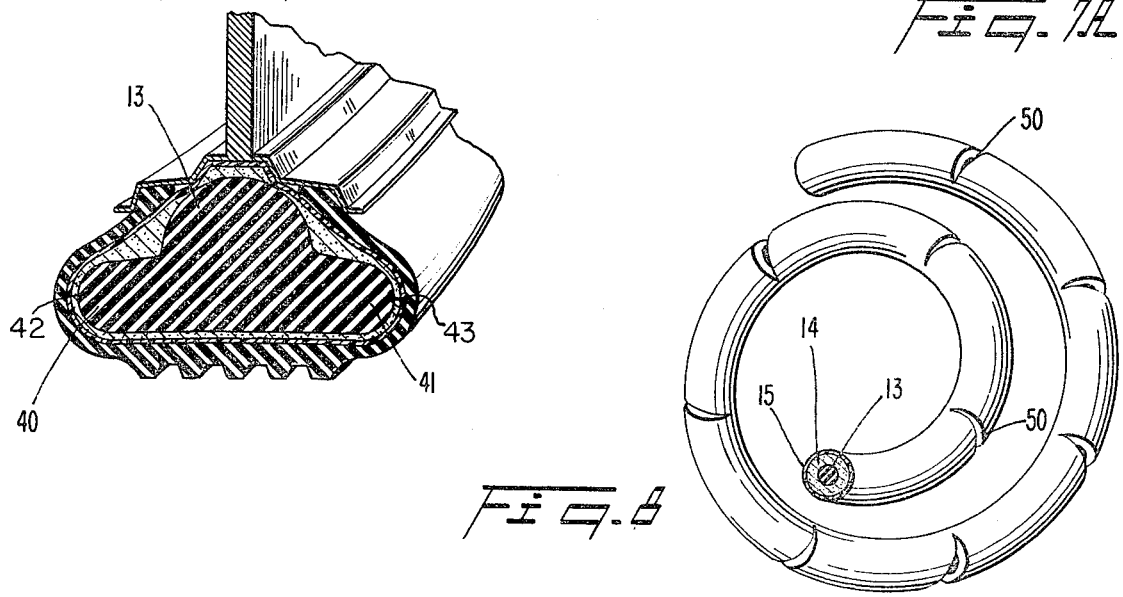

TUBELESS TIRE WITH INSERT FOR PREVENTING COLLAPSE IN THE EVENT OF LOSS OF AIR PRESSURE

BACKGROUND OF THE INVENTION

The present invention relates to tubeless tires and, more particularly, to inserts which facilitate rideability of a vehicle such as a car or truck for some distance on a punctured tire when immediate repair or replacement is not available.

The advent of tubeless tires for vehicles such as cars and trucks brought with it problems and dangers which have become of increasing concern in this present age of high speed and highway driving. Typically, the occurrence of a punctured tire while driving a vehicle is accompanied by loss of stability and control over the vehicle, the possibility of an accident with accompanying vehicle damage and human injury and the complete destruction of the tire and rim due to the pressure collapse of the tire and loss of bead between the tire and rim. Moreover, occupants are often left stranded and without transportation in some remote area, unable to repair the tire or drive the vehicle without a full set of tires.

Attempts have been made to overcome these problems by providing some sort of internal support system that would allow a vehicle to be driven despite a tire collapse. For example, U.S. Pat. No. 3,397,728 to McCrary discloses an annular steel safety insert mounted on a tire rim for preventing total collapse of a tire in the event of a blowout or puncture. U.S. Pat. No. 2,708,469 to Lydon discloses another tire construction for preventing total collapse of a tire due to blowout or puncture, including a cushion element, a shock absorber, a rigid support and an inflatable chamber. U.S. Pat. No. 3,250,310 to Johnson discloses a "tire buffer" which acts as an auxiliary wheel inside a tubeless tire in the event of a flat tire or blowout. Finally, U.S. Pat. No. 4,163,466 to Watts discloses a safety support to be mounted on a split rim inside a tubeless tire.

Among the deficiencies of these prior art devices is their complex construction and cost of manufacture. Moreover, those prior designs employing a safety support bearing on the tire rim of the vehicle have proved unsuccessful from an operational standpoint, as clearly discussed in U.S. Pat. No. 3,250,310. Additionally, prior art devices do not insure retention of the bead between the tire and rim, thus risking damage to or destruction of the tire.

The present invention provides an insert for a tubeless tire that overcomes the deficiencies of prior art designs and is comparatively simple in design and manufacture.

The present invention further provides an insert for use in vehicle tires which substantially reduces tire collapse after puncture or other loss of air pressure from within the tire.

The present invention further provides an insert for use in vehicle tires which prevents the loss of bead between a tire and rim when the tire has been punctured or otherwise loses internal air pressure.

The present invention further provides an insert for use in vehicle tires which prevents destruction of the tire and rim due to tire collapse resulting from puncture or other loss of internal air pressure.

The present invention further provides an insert for use in vehicle tires to facilitate control and safety in driving the vehicle after puncture or other loss of tire pressure when immediate repair or replacement of the tire is not available.

The present invention further provides an insert for use in vehicle tires which allows rideability for some distance after puncture or other loss of tire pressure when immediate repair or replacement of the tire is not possible.

SUMMARY OF THE INVENTION

The tubeless tire insert of the present invention maintains vehicle control and safety and prevents tire collapse in the event of puncture or other loss of air pressure. The insert generally comprises a toroidal center core of solid material, a foam casing annularly surrounding the toroidal core and a thin outer flexible shell annularly surrounding the casing. The core, casing and shell form a toroidal insert for placement within a tubeless tire.

Preferably, the insert of the present invention comprises a toroidal center core of solid material, the solid material being substantially noncompressible, a foam casing annularly surrounding the toroidal core, the foam casing being compressible but resilient, and a thin outer flexible shell annularly surrounding the casing, the thin outer shell preferably being made of a waterproof material, whereby the core, casing and shell form a toroidal insert for placement within a tubeless tire.

There is also preferably provided means for securing the insert to the inner bottom wall of the tubeless tire opposite the tire tread to prevent slippage of the insert relative to the tire.

There can also preferably be provided wedge means attached to the interior of the tire sidewalls for giving added strength thereto and preventing additional sidewall collapse after puncture or other loss of tire pressure. The insert can also preferably be provided with flange means integrally formed with the center core of the insert for giving added strength to the tire sidewalls and preventing additional sidewall collapse after puncture or other loss of tire pressure.

BRIEF DESCRIPTION OF THE DRAWINGS

FIG. 1 is a sectional view of a prior art flat tire without the insert of the present invention;

FIG. 2 is a sectional view of one embodiment of a tubeless tire including the insert of the present invention.

FIG. 3 is a section view of a tubeless tire, having inserted therein the insert shown in FIG. 2, after the tire has been punctured;

FIG. 4 is a perspective view of one embodiment of a means for securing the insert of the present invention to a tubeless tire;

FIGS. 5A–5F illustrate alternative embodiments for the center core of the tubeless tire insert of the present invention;

FIGS. 6A–6C are sectional views of a modification of the tubeless tire insert shown in FIG. 2;

FIGS. 7A–7B are side views of another modification of the tubeless tire insert shown in FIG. 2; and FIG. 8 shows another modification of the insert of the present invention facilitating easy hand installation.

DESCRIPTION OF THE PREFERRED EMBODIMENT

FIG. 1 shows an ordinary flat tire 1 on a rim 2. Assuming that the depicted tire collapse occurred while the vehicle was in motion, enormous pressure is created on the tire 1 and rim 2 from the opposing forces of the vehicle weight and ground surface 4. Pressure at point 3 causes the bead 5 of the tire 1 to collapse inwardly and break away from the rim 2. The tire 1 is destroyed by the forces between rim 2 and ground surface 4 created by the weight and motion of the vehicle. Control of the vehicle and occupant safety are endangered.

Referring to FIG. 2, there is shown one embodiment of the tubeless tire insert of the present invention aimed at eliminating the above-noted problems.

As shown in FIG. 2, a tubeless tire insert, broadly denoted as 10, is inserted within a tubeless tire 11 and the tubeless tire 11 mounted on a conventional tire rim 12.

In accordance with the present invention, the insert comprises a toroidal core of solid material, a foam casing annularly surrounding the core, and a thin outer shell annularly surrounding the casing. As embodied herein and as depicted in FIG. 2, the insert comprises a toroidal center core 13, a foam casing 14 surrounding the core 13, and a thin outer shell 15 surrounding the casing 14.

Center core 13 is made of a solid material that can be any of a wide variety of materials, for example, hard rubber, wood, canvas, felt, metal, cord, etc., depending on the weight and size desired considering the load to be carried and the degree of tire collapse to be allowed. The core must be able to support the weight of the vehicle, when the tire has been punctured and air expelled, without appreciable compression of the core. Preferably, the core is comprised of hard rubber.

The cross-sectional shape of center core 13, as shown in FIG. 2, is substantially circular. However, in accordance with the invention, any of a wide variety of cross-sectional shapes can be used. For example, as shown in FIGS. 5A to 5F, respectively, the cross-sectional shape can be substantially circular, block, trapezoidal wedge, bulb, spherical or spring-joined block. Generally, a single solid elongated core is used. However, further in accordance with the invention, the core may comprise a plurality of individual members, wherein the individual members are connected one to the other to form the core, such as the plurality of attached spherical balls shown in FIG. 5E or the plurality of attached blocks, i.e., the spring-joined blocks, shown in FIG. 5F.

Foam casing 14 is made of any soft sponge or foam material that can be compressed, but is resilient and will return to its original shape. For example, foam casing 14 may comprise any commercially-available plasticfoam that can be compressed but is resilient. The commercially-available material sold under the trademark NERF is preferred for use as the foam casing 14.

Thin outer shell 15 is made of any flexible and, preferably, waterproof material such as, for example, rubber, vinyl, cloth or plastic.

The total volume of the insert can vary within a wide range, although preferably the total volume, before tire inflation, is roughly equivalent to the inner volume of the tire. Likewise, the relative volumes of the core 13 and casing 14 can vary widely depending on the degree of collapse in the tire to be permitted, as will be explained in more detail below.

The center core 13 may be molded as a continuous toroidal piece and then encased in the foam casing 14 and outer shell 15. Conversely, the center core 13 may be made of a solid elongated piece, such as a cylinder, encased in the foam casing 14 and outer shell 15, and then joined at its ends to form a toroid. The method of making the tubeless tire insert is of no criticality to the present invention.

Referring to FIGS. 2 and 3, there will now be described the installation and operation of the tubeless tire insert of the present invention.

To be installed, the insert 10 of the present invention is simply placed within a tubeless tire 11 and the tire with its insert mounted on a tire rim 12.

The center core of the insert cannot be so large in cross-section that it prevents the tire from being mounted on a tire rim. Conversely, the core must be large enough to prevent damage to the sidewalls of the tire and breaking away of the tire bead from the rim when deflation occurs. The larger the cross-sectional area of the center core, the less tire collapse will result after deflating, because it is the center core that supports the vehicle weight and maintains a smooth contact with the ground surface by supporting the inner surface of the tire opposite the tread. Similarly, the foam casing 14 is resilient but also must be capable of compressing towards the core 13 so that clearance is allowed for mounting of the tire by conventional means.

After mounting of the tire with its insert, the tire is inflated and installed on a vehicle. The insert can substantially fill the volume of the tire. However, after inflation, there will be a fair volume of air in the tire, particularly between the insert and tire rim.

Referring to FIG. 3, there will now be described the operation of the insert after tire deflation. When the tire 11 is punctured and air lost from the tire, the foam casing 14 and thin outer shell 15 fill the voids of the collapsed tire and the insert rests against the rim 12. The solid center core 13 of the insert, due to its solid nature, supports the weight of the vehicle, minimizes tire collapse and prevents the bead 16 of the tire from breaking away from the rim 12. The bead 16 is preserved because the solid core 13 and to a certain extent the foam casing 14 prevent the bead, which would normally collapse inwardly away from the outer lip 17 of the rim, from so collapsing.

Additionally, solid core 13 and compressed foam 14 provide a solid, smooth surface against the bottom tire wall for maintaining a smooth ride on the ground surface, as well as control and safety of the vehicle.

In accordance with the invention, the insert may include means for securing the insert to the inner tire wall of the tubeless tire to prevent slippage of the insert relative to the tire.

As here embodied and as depicted in FIG. 4, the means for securing the insert to the inner bottom tire wall comprises Velcro strips 20 and 21 attached around the entire circumference of the inner tire wall and the thin outer shell of the insert. When the insert is placed within the tire the Velcro strips interlock, forming a firm bond between the tire and insert and preventing slippage therebetween.

While Velcro strips around the entire circumference of the tire and insert are shown in FIG. 4, any means for securing the tire and insert may be used. Furthermore, the means for securing need not be placed continuously around the entire circumference of the tire and insert but only at such points as will insure lack of slippage therebetween. It is preferred to use a detachable means for securing the insert to the inner bottom tire wall so that the insert can be transferred from one tire to another if desired. Securing the insert to the inner tire wall is preferred because it adds stability to the overall assembly.

Further in accordance with the invention, there may be provided wedge means attached to the interior of the tire sidewalls to give added strength thereto and prevent additional sidewall collapse after puncture or other loss of tire pressure.

As here embodied and as depicted in FIG. 6B, the wedge means comprises full circle wedges 30 and 31 attached on the inside of each sidewall around the entire periphery of the tire. Wedges 30, 31 can be made of any suitable solid noncompressible material such as hard rubber. When the tire is punctured, wedges 30, 31 give added support to the tire sidewalls, thus further preventing sidewall collapse and the possibility of tire damage. Additionally, the insert rests against wedges 30, 31, as seen in FIG. 6A, giving additional support and strength to the tire sidewalls after puncture. Finally, wedges 30, 31 give added centering stability to the insert, as the insert rests therebetween.

Wedges 30, 31 may comprise a plurality of two or more solid pieces, such as pieces 30, 31 shown in FIGS. 6A–6B, or may be molded in a single piece 32 such as shown in FIG. 6C.

Further in accordance with the invention, the insert for tubeless tires may include flange means connected to the center core to give added strength to the tire sidewalls and prevent additional sidewall collapse after puncture or other loss of tire pressure.

As here embodied and as depicted in FIG. 7A, the flange means comprises ears or flanges 40, 41 integrally formed with center core 13. Flanges 40, 41 can be constructed of the same material as center core 13 and are formed as an integral part thereof. However, when a tire is punctured, flanges 40, 41 will give way and bow out at points 42, 43 because of the force between the weight of the vehicle and the ground surface.

Referring to FIG. 7B, when the tire is deflated, the flanges 40, 41 bow out towards the tire sidewalls, thus further supporting the sidewalls from collapse and thus further preventing tire collapse.

Referring to FIG. 8, and further in accordance with the invention, there is shown a modification of the insert of the present invention facilitating easy installation in a tubeless tire. As here embodied and as depicted in FIG. 8, the insert is split or gashed along its length across its cross-section at various points 50. The number and location of the splits are purely optional as desired. However, it has been found that the provision of such splits aids in the installation of the insert within a tubeless tire, especially a deflated tire already on a rim. This provision eliminates the possibility of having to completely remove the tire from the rim before placing the insert therein.

What is claimed is:

1. The combination of an inflatable tubeless tire and an insert within the tubeless tire for preventing collapse in the event of loss of air pressure, the insert comprising:
    (a) a toroidal core of solid material;
    (b) a resilient foam casing annularly surrounding the core;
    (c) a thin outer flexible shell annularly surrounding the casing; and
    (d) flange means flexibly and integrally formed as part of the core for bowing out towrds the tire sidewalls after puncture of other loss of air pressure to give added strength to the tire sidewalls and prevent additional collapse.

2. The combination of an inflatable tubeless tire and an insert within the tubeless tire for preventing collapse in the event of loss of air pressure, the insert comprising:
    (a) a toroidal core of solid material;
    (b) a resilient foam casing annularly surrounding the core;
    (c) a thin outer flexible shell annularly surrounding the casing; and further including wedge means attached to the interior of the tire sidewalls to give added strength thereto and prevent additional sidewall collapse after puncture or other loss of air pressure.

3. The combination of an inflatable tubeless tire and an insert within the tubeless tire for preventing collapse in the event of loss of air pressure, the insert comprising:
    (a) a toroidal core of solid material;
    (b) a resilient foam casing annularly surrounding the core;
    (c) a thin outer flexible shell annularly surrounding the casing; and
    (d) means for detachably securing the insert to the inner bottom tire wall to prevent slippage of the insert relative to the tire.

4. The insert according to claim 3 wherein the foam casing comprises a compressible but resilient foam that is restored to its original shape after the release of pressure.

5. The insert according to claim 3 wherein the core comprises hard rubber and the outer shell comprises a waterproof material.

6. The insert according to claim 3 wherein the volume of the insert is substantially equal to the interior volume of the tire.

7. The insert according to claim 3 wherein the core comprises a plurality of individual members, the members connected one to the other to form the core.

8. The insert according to claim 1 further including flange means flexibly and integrally formed as part of the core for bowing out towards the tire sidewalls after puncture or other loss of air pressure to give added strength to the tire sidewalls and prevent additional collapse.

9. The insert according to claim 3 wherein the cross-section of the core is substantially circular.

10. The insert according to claim 3 further including wedge means attached to the interior of the tire sidewalls to give added strength thereto and prevent additional sidewall collapse after puncture or other loss of tire pressure.

* * * * *